(12) United States Patent
Nicholson et al.

(10) Patent No.: US 10,996,924 B2
(45) Date of Patent: May 4, 2021

(54) DRAWING ATTENTION TO A GRAPHICAL ELEMENT ON A DISPLAY

(71) Applicant: LENOVO (Singapore) PTE. LTD., New Tech Park (SG)

(72) Inventors: John Weldon Nicholson, Cary, NC (US); Daryl Cromer, Raleigh, NC (US); Howard Locker, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/368,730

(22) Filed: Mar. 28, 2019

(65) Prior Publication Data

US 2020/0310750 A1    Oct. 1, 2020

(51) Int. Cl.
| | |
|---|---|
| *G06F 3/16* | (2006.01) |
| *G06F 3/0484* | (2013.01) |
| *G06F 3/01* | (2006.01) |
| *G06F 3/14* | (2006.01) |

(52) U.S. Cl.
CPC ............. *G06F 3/167* (2013.01); *G06F 3/013* (2013.01); *G06F 3/04845* (2013.01); *G06F 3/1446* (2013.01); *G06F 2203/04801* (2013.01); *G09G 2354/00* (2013.01)

(58) Field of Classification Search
CPC ..... G06F 3/167; G06F 3/1446; G06F 3/04845
See application file for complete search history.

(56) References Cited

U.S. PATENT DOCUMENTS

| | | | | |
|---|---|---|---|---|
| 7,142,192 | B2 * | 11/2006 | De Waal | G06F 3/038 345/157 |
| 2005/0047624 | A1 * | 3/2005 | Kleen | H04R 5/02 381/388 |
| 2010/0045596 | A1 * | 2/2010 | De Leon | G06F 3/013 345/157 |
| 2013/0135348 | A1 * | 5/2013 | Anzai | G06T 19/006 345/633 |
| 2016/0026242 | A1 * | 1/2016 | Burns | G02B 27/017 345/633 |
| 2016/0313805 | A1 * | 10/2016 | Vroom | G06F 3/013 |

FOREIGN PATENT DOCUMENTS

JP    2006225421    *  8/2006

* cited by examiner

*Primary Examiner* — Sherrod L Keaton
(74) *Attorney, Agent, or Firm* — Kunzler Bean & Adamson (57) ABSTRACT

Apparatuses, methods, systems, and program products are disclosed for drawing attention to a graphical element on a display. An apparatus includes a display, a processor, and a memory that stores code executable by the processor. The memory stores code executable by the processor to detect a voice cue. The voice cue may include a predefined command associated with drawing a user's attention to a graphical element that is presented on the display. The memory stores code executable by the processor to determine a location of the graphical element that is presented on the display in response to the voice cue. The memory stores code executable by the processor to draw the user's attention to the graphical element on the display in response to determining the location of the graphical element on the display.

19 Claims, 6 Drawing Sheets

DRAWING ATTENTION TO A GRAPHICAL ELEMENT ON A DISPLAY

FIELD

The subject matter disclosed herein relates to graphical user interfaces, and more particularly relates to drawing attention to a graphical element on a display in response to a voice cue.

BACKGROUND

A graphical element such as a cursor on a display can be difficult to locate. It may even more difficult if there are multiple displays that the graphical element could be presented on. This issue may be exacerbated in virtual reality or augmented reality environments.

BRIEF SUMMARY

An apparatus for drawing attention to a graphical element on a display is disclosed. An apparatus, in one embodiment, includes a display, a processor, and a memory that stores code executable by the processor. In certain embodiments, the memory stores code executable by the processor to detect a voice cue. The voice cue may include a predefined command associated with drawing a user's attention to a graphical element that is presented on the display. In some embodiments, the memory stores code executable by the processor to determine a location of the graphical element that is presented on the display in response to the voice cue. In various embodiments, the memory stores code executable by the processor to draw the user's attention to the graphical element on the display in response to determining the location of the graphical element on the display.

A method for drawing attention to a graphical element on a display includes, in one embodiment, detecting, by a processor, a voice cue. The voice cue may include a predefined command associated with drawing a user's attention to a graphical element that is presented on a display. The method, in some embodiments, includes determining a location of the graphical element that is presented on the display in response to the voice cue. The method, in various embodiments, includes drawing the user's attention to the graphical element on the display in response to determining the location of the graphical element on the display.

A program product for drawing attention to a graphical element on a display, in one embodiment, includes a computer readable storage medium that stores code executable by a processor. In some embodiments, the executable code includes code to perform detecting a voice cue. The voice cue may include a predefined command associated with drawing a user's attention to a graphical element that is presented on a display. The executable code, in certain embodiments, includes code to perform determining a location of the graphical element that is presented on the display in response to the voice cue. The executable code, in certain embodiments, includes code to perform drawing the user's attention to the graphical element on the display in response to determining the location of the graphical element on the display.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for drawing attention to a graphical element on a display is disclosed. An apparatus, in one embodiment, includes a display, a processor, and a memory that stores code executable by the processor. In certain embodiments, the memory stores code executable by the processor to detect a voice cue. The voice cue may include a predefined command associated with drawing a user's attention to a graphical element that is presented on the display. In some embodiments, the memory stores code executable by the processor to determine a location of the graphical element that is presented on the display in response to the voice cue. In various embodiments, the memory stores code executable by the processor to draw the user's attention to the graphical element on the display in response to determining the location of the graphical element on the display.

In one embodiment, the code is executable by the processor to draw the user's attention to the location of the graphical element on the display by darkening a brightness of the display except for a region of the display where the graphical element is located. In some embodiments, the code is further executable by the processor to gradually darken the brightness of the display except for the region of the display where the graphical element is located until one of: the darkened region of the display is black, and the graphical element is moved.

In certain embodiments, the code is further executable by the processor to reset the brightness of the darkened region of the display in response to the graphical element being moved. In various embodiments, the code is executable by the processor to draw the user's attention to the location of the graphical element on the display by providing a verbal indicator of where the graphical element is located on the display. In one embodiment, the verbal indicator comprises a direction to the location of the graphical element on the display relative to the user's position and/or where the user is looking.

In further embodiments, the code is executable by the processor to draw the user's attention to the location of the graphical element on the display by presenting an indicator on the display that points to the location of the graphical element on the display. In one embodiment, the code is executable by the processor to present the indicator on the display at a location where the user is currently looking.

In some embodiments, the code is further executable by the processor to draw the user's attention to the graphical element by moving the graphical element to a location where the user is looking at the display in response to the voice cue. The voice cue may include a specific command to move the graphical element to the location on the display where the user is looking.

In one embodiment, the display is one of a plurality of displays that are operably interconnected such that the graphical element is moveable between each of the plurality of displays. In certain embodiments, each of the plurality of displays comprises a virtual display that is presented within one or more of a virtual reality environment and an augmented reality environment.

A method for drawing attention to a graphical element on a display includes, in one embodiment, detecting, by a processor, a voice cue. The voice cue may include a predefined command associated with drawing a user's attention to a graphical element that is presented on a display. The method, in some embodiments, includes determining a location of the graphical element that is presented on the display in response to the voice cue. The method, in various embodiments, includes drawing the user's attention to the graphical element on the display in response to determining the location of the graphical element on the display.

In one embodiment, drawing the user's attention to the location of the graphical element on the display comprises darkening a brightness of the display except for a region of the display where the graphical element is located. In certain embodiments, the method includes gradually darkening the brightness of the display except for the region of the display where the graphical element is located until one of: the darkened region of the display is black, and the graphical element is moved. In on embodiment, the method includes resetting the brightness of the darkened region of the display in response to the graphical element being moved.

In one embodiment, drawing the user's attention to the location of the graphical element on the display comprises providing a verbal indicator of where the graphical element is located on the display. The verbal indicator may include a direction to the location of the graphical element on the display relative to the user's position and/or where the user is looking. In certain embodiments, drawing the user's attention to the location of the graphical element on the display comprises presenting an indicator on the display that points to the location of the graphical element on the display. The indicator may be presented on the display at a location where the user is currently looking.

In one embodiment, drawing the user's attention to the graphical element comprises moving the graphical element to a location where the user is looking at the display in response to the voice cue. The voice cue may include a specific command to move the graphical element to the location on the display where the user is looking. In various embodiments, the display is one of a plurality of virtual displays, each of the plurality of virtual displays presented within one or more of a virtual reality environment and an augmented reality environment.

A program product for drawing attention to a graphical element on a display, in one embodiment, includes a computer readable storage medium that stores code executable by a processor. In some embodiments, the executable code includes code to perform detecting a voice cue. The voice cue may include a predefined command associated with drawing a user's attention to a graphical element that is presented on a display. The executable code, in certain embodiments, includes code to perform determining a location of the graphical element that is presented on the display in response to the voice cue. The executable code, in certain embodiments, includes code to perform drawing the user's attention to the graphical element on the display in response to determining the location of the graphical element on the display.

Figure 1:
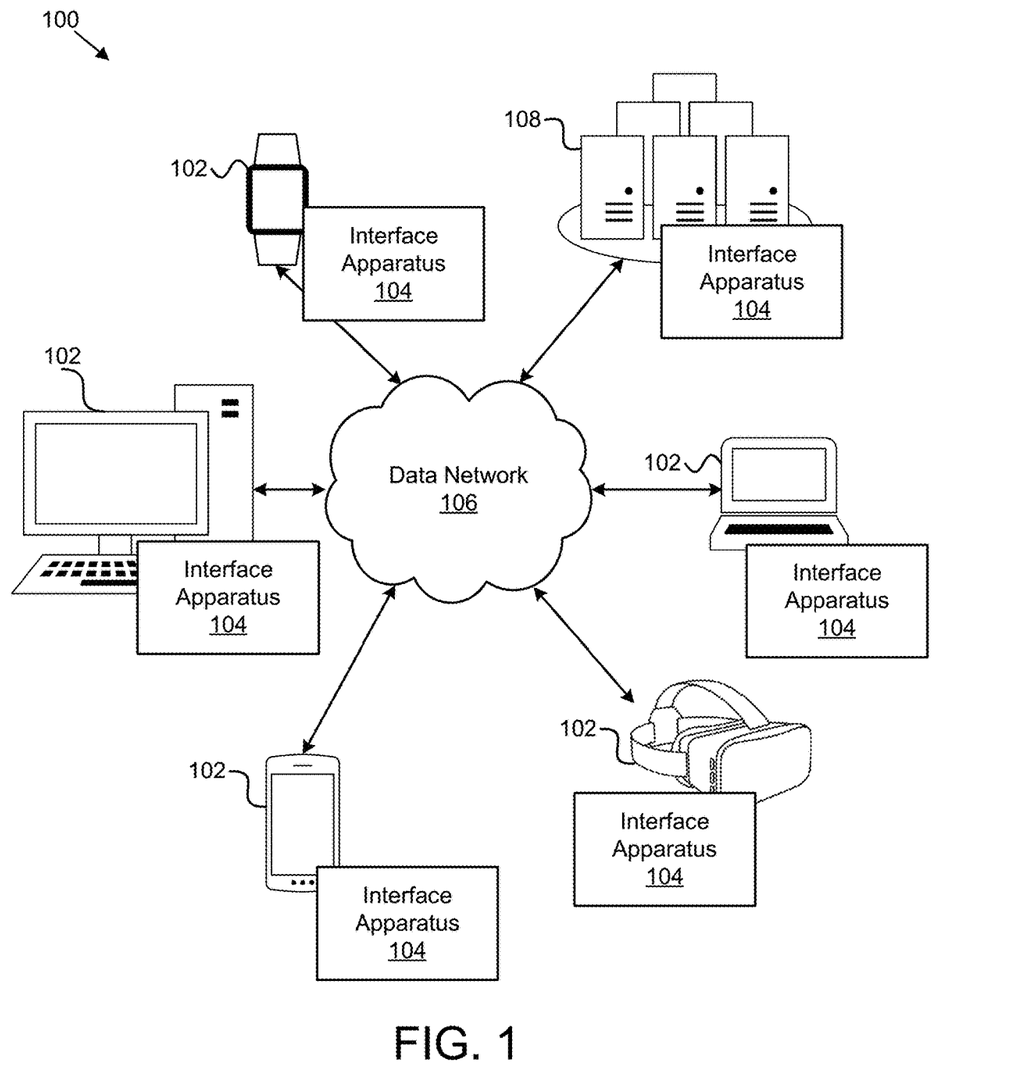
FIG. 1 is a schematic block diagram illustrating one embodiment of a system for drawing attention to a graphical element on a display.

FIG. 1 is a schematic block diagram illustrating one embodiment of a system 100 for dynamically determining a user's availability for an activity. In one embodiment, the system 100 includes one or more information handling devices 102, one or more interface apparatuses 104, one or more data networks 106, and one or more servers 108. In certain embodiments, even though a specific number of information handling devices 102, interface apparatuses 104, data networks 106, and servers 108 are depicted in FIG. 1, one of skill in the art will recognize, in light of this disclosure, that any number of information handling devices 102, interface apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, an augmented reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may be coupled to one or more display devices for presenting graphical information/elements, e.g., graphical user interfaces that use windows, menus and/or cursors to select items, click on items, open items, and/or the like.

In certain embodiments, the information handling device 102 may be configured to run virtual reality or augmented reality applications, programs, software, environments, and/or the like. In such an embodiment, the virtual reality or augmented reality environments may present one or more virtual displays that are configured for presenting graphical information/elements, e.g., graphical user interfaces that use windows, menus, and/or cursors to select items, click on items, open items, and/or the like similar to a physical display device except in a virtual environment.

In one embodiment, the interface apparatus 104 is configured to detect a voice cue that includes a command for triggering, initiating, causing, or the like attention to be drawn to the location of a graphical element on a display so that the user can quickly and easily find the graphical element even if there are not direct or tangible ways to locate the graphical element, such as moving a mouse around to move a cursor until the user spots the cursor moving. The interface apparatus 104 improves upon conventional means for finding or locating the graphical element, e.g., such as moving an input device like a mouse until a cursor is located, pressing a button to cause some kind of action to occur around the cursor, or the like because the conventional means require an input device such as a keyboard or mouse.

This is also an issue with virtual reality of augmented reality environments where there may not be input devices like a keyboard or a mouse that the user interacts with directly to move a cursor around in the environment. As used herein, a virtual reality environment is an interactive, virtual, digital, or otherwise computer generated three-dimensional environment or simulation. An augmented reality environment may be considered a form of virtual reality that layers virtual information over a camera feed into a headset or through a smartphone or tablet or other information handling device 102 giving the user the ability to view three-dimensional images. The interface apparatus 104, including its various sub-modules, may be located on one or more information handling devices 102 in the system 100, one or more servers 108, one or more network devices, and/or the like. The interface apparatus 104 is described in more detail below with reference to FIG. 2.

In various embodiments, the interface apparatus 104 may be embodied as a hardware appliance that can be installed or deployed on an information handling device 102, on a server 108, or elsewhere on the data network 106. In certain embodiments, the interface apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the interface apparatus 104 may include a power interface, a wired and/or wireless network interface, a graphical interface that attaches to a display, and/or a semiconductor integrated circuit device as described below, configured to perform the functions described herein with regard to the interface apparatus 104.

The interface apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the interface apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the interface apparatus 104.

The semiconductor integrated circuit device or other hardware appliance of the interface apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the interface apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. For instance, a server 108 may be an intermediary between information handling devices 102 to facilitate sending and receiving electronic messages between the information handling devices 102.

Figure 2:
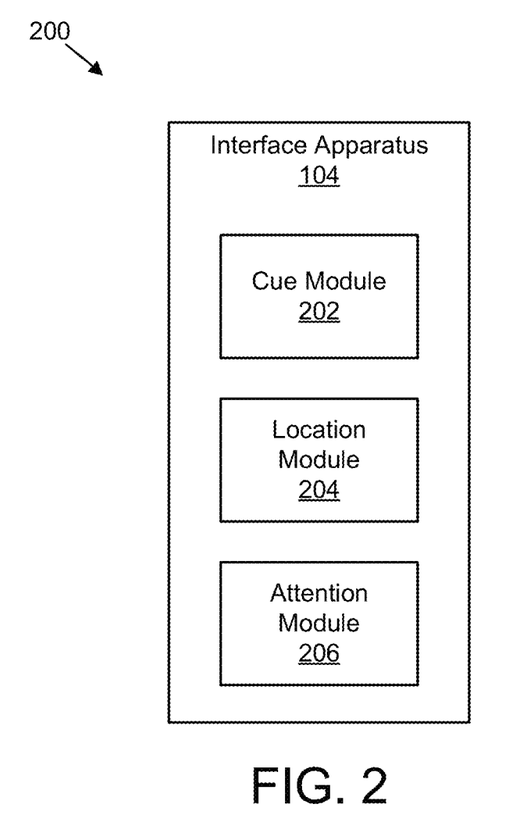
FIG. 2 is a schematic block diagram illustrating one embodiment of an apparatus for drawing attention to a graphical element on a display.

FIG. 2 is a schematic block diagram illustrating one embodiment of an apparatus 200 for drawing attention to a cursor on a display. In one embodiment, the apparatus 200 includes an embodiment of an interface apparatus 104. The interface apparatus 104, in some embodiments, includes one or more of a cue module 202, a location module 204, and an attention module 206, which are described in more detail below.

The cue module 202, in one embodiment, is configured to detect a voice cue. A voice cue, as used herein, may comprise a spoken word, phrase, sentence, command, or the like that is intended to trigger an action. For instance, the voice cue may include a predefined command that is associated with drawing the user's attention to a graphical element such as a cursor, window, menu, notification, alert, and/or the like that is presented on a display of an information handling device 102. A graphical element, as used herein, may be graphical user interface elements that provide a way to convey or represent information on a computer display in a graphical form. Examples may include graphical interface windows, menus, cursors, and/or the like. As used herein, a cursor may be a graphical or virtual indicator used to show the current position for user interaction on a computer monitor or other display device that may respond to input from a text input or pointing device.

In one embodiment, the cue module 202 detects the voice cue using a microphone or other sensor or device configured to capture sound. The cue module 202 may process the voice cue to determine if the voice cue includes a predefined command that is associated with drawing attention to a graphical element presented on a display. For instance, the cue module 202 may run speech recognition algorithms, speech-to-text algorithms, or the like on the captured voice cue to identify words and/or phrases that are part of the voice cue and may compare the identified words and/or phrases to predefined commands that are associated with drawing the user's attention to a graphical element. For example, the voice cue may include a phrase such as "where is the cursor", "where is the email window", "where are the pictures", "where is the active document", or simply "cursor", "window 1", "active window", and/or the like.

In one embodiment, the location module 204 is configured to determine a location of a graphical element on a display in response to the voice command. The location module 204, for example, may query an operating system, a device driver, and/or the like (e.g., using an application programming interface, or the like) for the current coordinates or position of the cursor, such as an x-y coordinate for a two-dimensional space, an x-y-z, coordinate for a three-dimensional space, or the like. In a further example, the location module 204 may track, collect, store, or the like the coordinates of the graphical element in response to the graphical element being moved, clicked, or in response to another interaction event.

The attention module 206, in one embodiment, is configured to draw the user's attention to the graphical element on the display in response to the voice cue and in response to determining the location of the graphical element on the display. Drawing the user's attention to the graphical element may include making the graphical element more visible on the display, providing visual and/or audio indicators that direct the user's view to the graphical element, and/or the like.

Figure 3A:
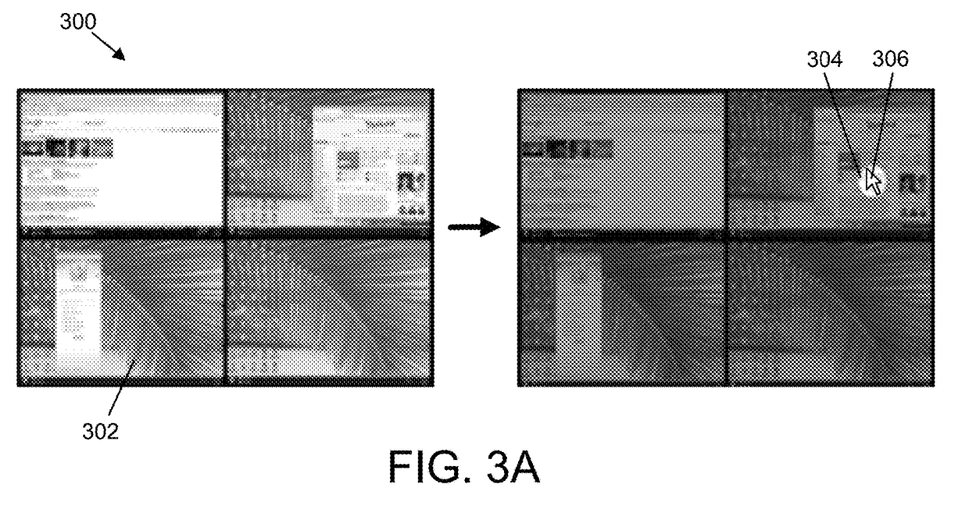
FIG. 3A illustrates one embodiment of drawing attention to a graphical element on a display.

For instance, in one embodiment, the attention module 206 darkens the brightness of the display except for a region of the display where a cursor is located. As shown in FIG. 3A, the attention module 206 may command, instruct, or direct the operating system, a display driver, and/or the like to darken the display(s) 302 to a specific darkness level, by a percentage, and/or the like except for a region 304 of the display where the cursor 306 is located. In this manner, the cursor 306 may stand-out visually to the user so that it can be easily located/found.

In some embodiments, the attention module 206 gradually darkens the display(s) 302 except the region 304 where the cursor 306 is located until the display(s) 302 are completely dark (e.g., completely black or some other color). In certain embodiments, the attention module 206 resets the brightness of the darkened region of the display(s) 302 in response to the cursor 306 being located by the user, e.g., in response to the cursor 306 being moved, looked at, pointed to, or the like.

Figure 3B:
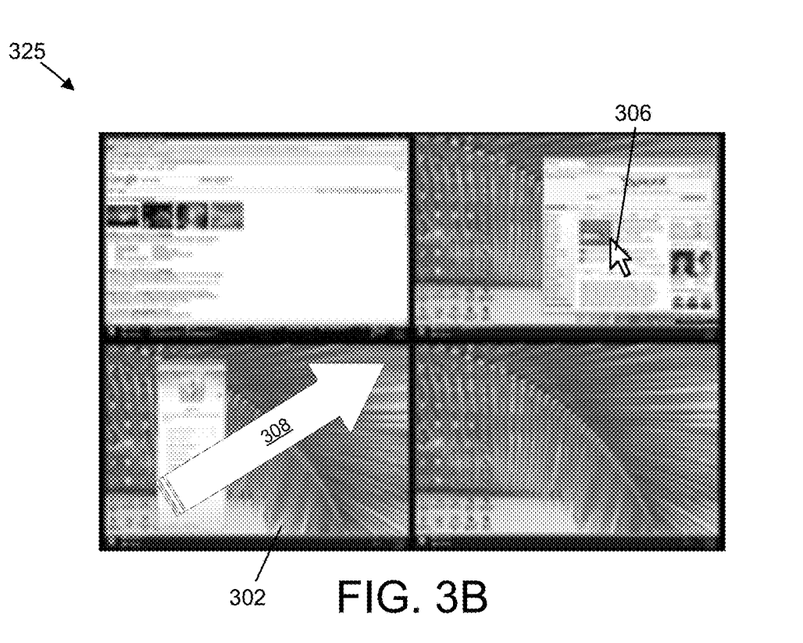
FIG. 3B illustrates another embodiment of drawing attention to a graphical element on a display.

Referring again to FIG. 2, in one embodiment, the attention module 206 is configured to draw the user's attention to the location of the graphical element on the display by presenting an indicator on the display that points to the location of the graphical element on the display. As illustrated in FIG. 3B, the attention module 206 may present an arrow 308 or other graphical indicator on one or more displays 302 that points to where a cursor 306 is located on a display 306.

The attention module 206, in certain embodiments, may present multiple arrows 308 at different positions on the display(s) 302 that each point to the location where the cursor 306 is located. In further embodiments, the attention module 206 moves the arrow 308 around the display(s) 302 based on where the user's eye gaze is detected. For example, the attention module 206 may track the user's eye gaze, e.g., using image data captured using a camera or video camera, and may position the arrow at the location of the user's eye gaze, e.g., at the x-y coordinates or x-y-z coordinates of the display 302 where the user is looking. And as the user continues to look around, the attention module 206 may continue to move the arrow consistent with the user's eye gaze until the user's eye gaze is at the same location as the cursor 306, until the cursor 306 moves, or the like.

Referring again to FIG. 2, in one embodiment, the attention module 206 is configured to draw the user's attention to the location of the graphical element on the display by providing a verbal indicator of where the graphical element is located on the display. For instance, if the user is in a three-dimensional virtual reality or augmented reality environment, the attention module 206 may provide a verbal indication of where the graphical element is in the three-dimensional environment relative to the user's virtual position within the environment, relative to where the user is looking (e.g., based on the user's eye gaze), and/or the like.

For example, the attention module 206 may determine the user's physical or virtual position or where the user is looking in the three-dimensional virtual environment, including the direction that the user is looking, and may provide a verbal direction such as "behind you", "above you", "below you", or the like. Other directions may include cardinal directions such as north, south, east, west. Other directions may include up, down, under, over, or the like.

Some directions may include an identifier for a virtual display that the graphical element is presented on. For instance, if there are ten virtual displays presented within the three-dimensional environment, each with an assigned identifier such as "Display 1" that is visible to the user, the attention module 206 may first direct the user to the display that has the graphical element using the display identifier, and then may further utilize other means described herein to draw the user's attention to the location of the graphical element on the identified virtual display.

In one embodiment, the attention module 206 is configured to draw the user's attention to the graphical element by moving the graphical element to a location where the user is looking at the display in response to the voice cue. In such an embodiment, the voice cue includes a specific command to move the graphical element to the location on the display where the user is looking.

Figure 3C:
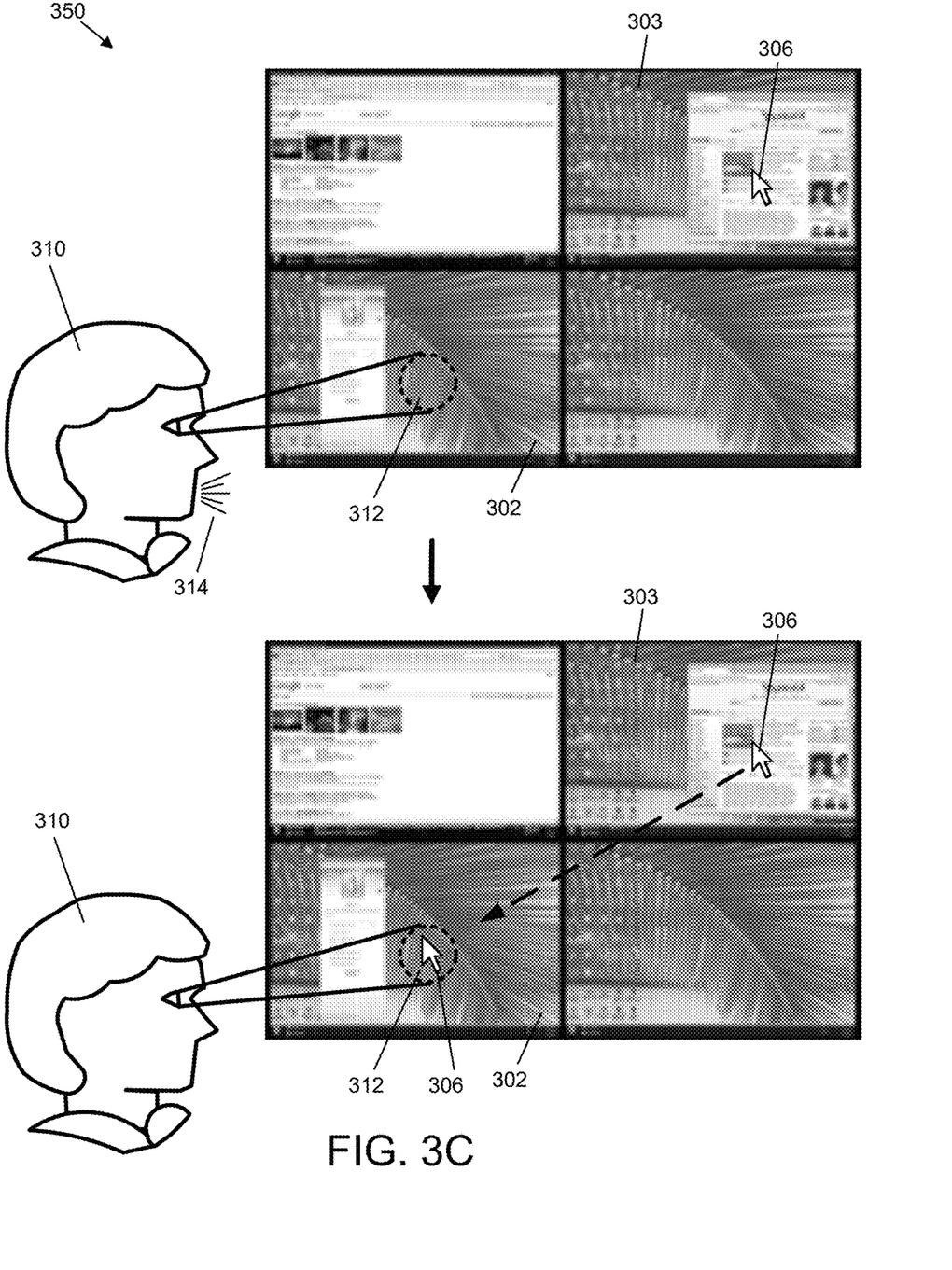
FIG. 3C illustrates yet another embodiment of drawing attention to a graphical element on a display.

As illustrated in FIG. 3C, a user 310 may be looking at a location 312 on a first display 302, as determined based on tracking the user's eye gaze, and a cursor 306 may be located on a second display 303 that the user is not looking at. The user 310 may provide a voice command 314 such as "move here" or "cursor" or the like, which may trigger the attention module 206 to automatically move the cursor 306 from the second display 303 to the location 312 on the first display 302 where the user is looking.

Referring again to FIG. 2, the attention module 206 is configured to draw the user's attention to the graphical element by changing the graphical element to a color that contrasts with the background that the cursor is against. For example, the attention module 206 may change the color of a cursor to neon orange, or bright yellow, or black if it is against a white background, or the like. In further embodiments, the attention module 206 is configured to draw the user's attention to the graphical element by causing the graphical element to flash, blink, or pulsate at an increasing rate. In certain embodiments, the attention module 206 may cause the graphical element to move around a display without input from the user until the user manually moves the graphical element or locates the graphical element with his/her eyes.

Figure 4:
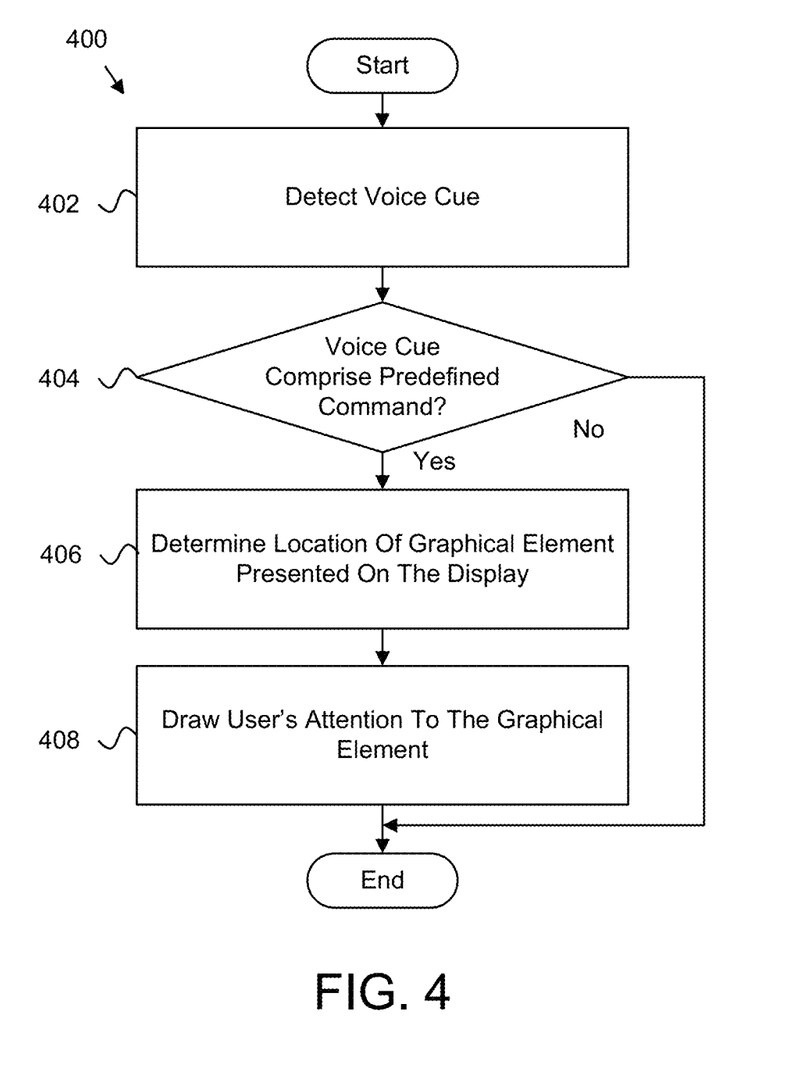
FIG. 4 is a schematic flow chart diagram illustrating one embodiment of a method for drawing attention to a graphical element on a display.

FIG. 4 is a schematic flow chart diagram illustrating one embodiment of a method 400 for drawing attention to a graphical element on a display. In one embodiment, the method 400 begins and detects 402 a voice cue. The method 400, in certain embodiments, determines 404 whether the voice cue includes a predefined command associated with drawing a user's attention to a graphical element that is presented on the display. If not, the method 400 ends. Otherwise, in some embodiments, the method 400 determines 406 a location of the graphical element that is presented on the display in response to the voice cue. In further embodiments, the method 400 draws 408 the user's attention to the graphical element on the display in response to determining the location of the graphical element on the display, and the method 400 ends. In various embodiments, the cue module 202, the location module 204, and the attention module 206 perform the various steps of the method 400.

Figure 5:
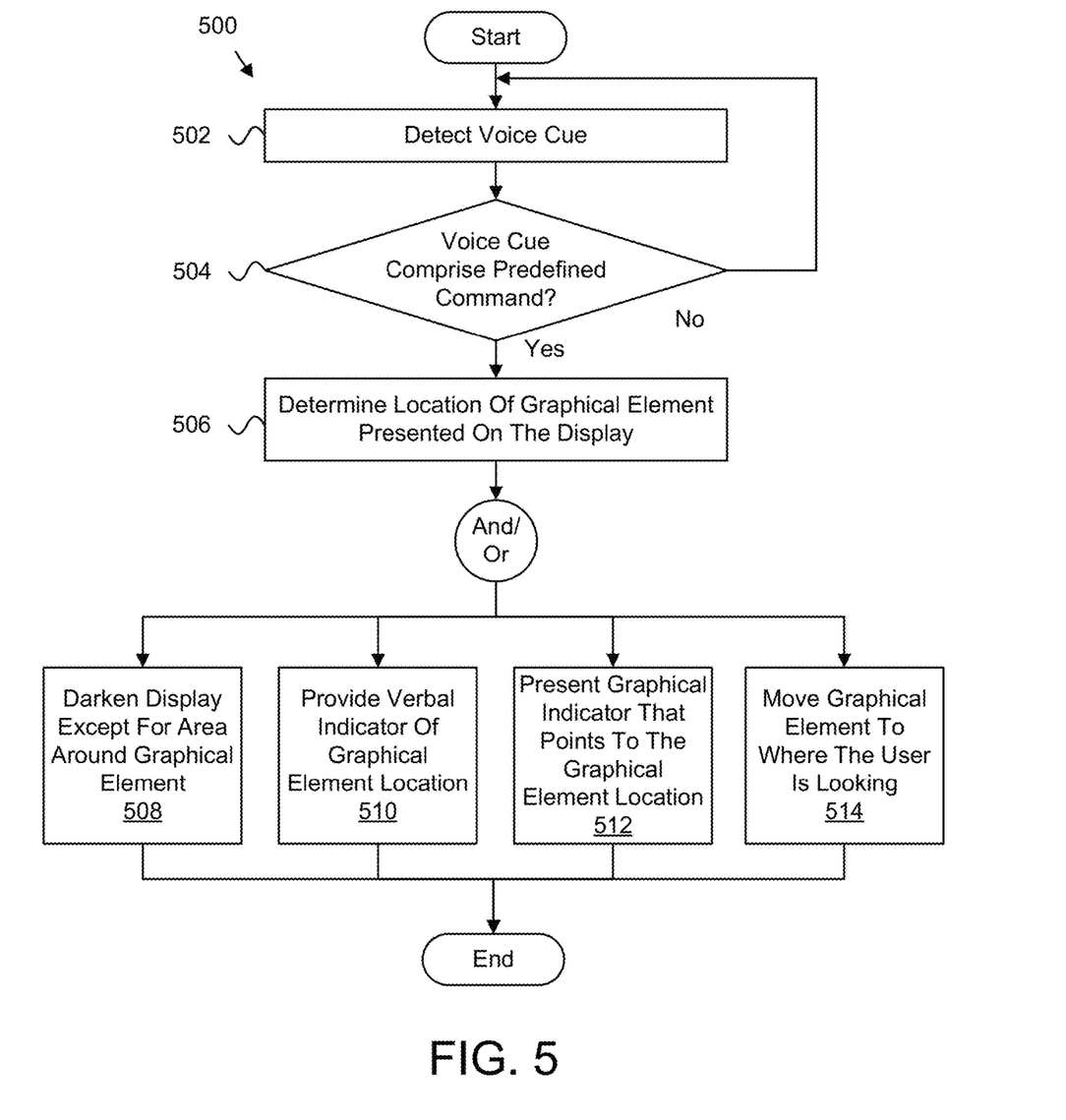
FIG. 5 is a schematic flow chart diagram illustrating one embodiment of another method for drawing attention to a graphical element on a display.

FIG. 5 is a schematic flow chart diagram illustrating one embodiment of another method 500 for drawing attention to a graphical element on a display. In one embodiment, the method 500 begins and detects 502 a voice cue. The method 500, in certain embodiments, determines 504 whether the voice cue includes a predefined command associated with drawing a user's attention to a graphical element that is presented on the display. If not, the method 500 continues to detect 502 voice cues. Otherwise, in some embodiments, the method 500 determines 506 a location of the graphical element that is presented on the display in response to the voice cue.

In further embodiments, the method 500 draws the user's attention to the graphical element on the display by one or more of (1) darkening 508 brightness of the display except for a region of the display where the graphical element is located; (2) providing 510 a verbal indicator of where the graphical element is located on the display; (3) presenting 512 an indicator on the display that points to the location of the graphical element on the display; and/or (4) moving 514 the graphical element to a location where the user is looking at the display in response to the voice cue, and the method 500 ends. In various embodiments, the cue module 202, the location module 204, and the attention module 206 perform the various steps of the method 500.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
   a display;
   a sound capture device;
   a speaker;
   a camera;
   a processor; and
   a memory that stores code executable by the processor to:
   detect a voice cue using the sound capture device, the voice cue comprising a predefined command associated with drawing a user's attention to a graphical element that is presented on the display;
   determine a location of the graphical element that is presented on the display in response to the voice cue; and
   draw the user's attention to the graphical element on the display in response to determining the location of the graphical element on the display by providing a verbal indicator, via the speaker, of where the graphical element is located on the display, the verbal indicator comprising a direction to the location of the graphical element on the display relative to where the user is looking based on eye tracking information captured using the camera.

2. The apparatus of claim 1, wherein the code is further executable by the processor to reset the brightness of the darkened region of the display in response to the graphical element being moved.

3. The apparatus of claim 1, wherein the verbal indicator comprises a direction to the location of the graphical element on the display further relative to the user's position.

4. The apparatus of claim 1, wherein the code is executable by the processor to draw the user's attention to the location of the graphical element on the display by presenting an indicator on the display that points to the location of the graphical element on the display.

5. The apparatus of claim 4, wherein the code is executable by the processor to present the indicator on the display at a location where the user is currently looking.

6. The apparatus of claim 1, wherein the code is further executable by the processor to draw the user's attention to the graphical element by moving the graphical element to a location where the user is looking at the display in response to the voice cue, the voice cue comprising a specific command to move the graphical element to the location on the display where the user is looking.

7. The apparatus of claim 1, wherein the display is one of a plurality of displays that are operably interconnected such that the graphical element is moveable between each of the plurality of displays.

8. The apparatus of claim 7, wherein each of the plurality of displays comprises a virtual display that is presented within one or more of a virtual reality environment and an augmented reality environment.

9. The apparatus of claim 3, wherein the direction comprises a direction relative to the user's physical position within a three-dimensional virtual environment.

10. The apparatus of claim 9, wherein the direction includes an identifier for a virtual display that the graphical element is presented on within the three-dimensional virtual environment.

11. The apparatus of claim 1, wherein the code is further executable by the processor to change one or more properties of the graphical element in response to the voice cue, the one or more properties comprising a color of the graphical element, a blinking rate of the graphical element, and a movement of the graphical element.

12. The apparatus of claim 7, wherein the indicator comprises one of multiple graphical arrows that are presented at different position on the display and that each point to the location where the graphical element is located, the graphical arrows moving around the display based on where the user's eye gaze is detected.

13. A method comprising:
   detecting, by a processor and a sound capture device, a voice cue, the voice cue comprising a predefined command associated with drawing a user's attention to a graphical element that is presented on a display;
   determining a location of the graphical element that is presented on the display in response to the voice cue; and
   drawing the user's attention to the graphical element on the display in response to determining the location of the graphical element on the display by providing a verbal indicator, via a speaker, of where the graphical element is located on the display, the verbal indicator comprising a direction to the location of the graphical element on the display relative to where the user is looking based on eye tracking information captured using a camera.

14. The method of claim 13, further comprising resetting the brightness of the darkened region of the display in response to the graphical element being moved.

15. The method of claim 13, wherein drawing the user's attention to the location of the graphical element on the display comprises providing a verbal indicator of where the graphical element is located on the display, the verbal indicator comprising a direction to the location of the graphical element on the display relative to one or more of the user's position and where the user is looking.

16. The method of claim 13, wherein drawing the user's attention to the location of the graphical element on the display comprises presenting an indicator on the display that points to the location of the graphical element on the display, the indicator presented on the display at a location where the user is currently looking.

17. The method of claim 13, wherein drawing the user's attention to the graphical element comprises moving the graphical element to a location where the user is looking at the display in response to the voice cue, the voice cue comprising a specific command to move the graphical element to the location on the display where the user is looking.

18. The method of claim 13, wherein the display is one of a plurality of virtual displays, each of the plurality of virtual displays presented within one or more of a virtual reality environment and an augmented reality environment.

19. A program product comprising a non-transitory computer readable storage medium that stores code executable by a processor, the executable code comprising code to perform:

detecting a voice cue using a sound capture device, the voice cue comprising a predefined command associated with drawing a user's attention to a graphical element that is presented on a display;

determining a location of the graphical element that is presented on the display in response to the voice cue;

drawing the user's attention to the graphical element on the display in response to determining the location of the graphical element on the display by gradually darkening a brightness of the display except for a region of the display where the graphical element is located and by providing a verbal indicator, via a speaker, of where the graphical element is located on the display, the verbal indicator comprising a direction to the location of the graphical element on the display relative to where the user is looking based on eye tracking information captured using the camera; and resetting the brightness of the darkened region of the display in response to the user looking at the graphical element.

* * * * *